(12) United States Patent
Mochizuki et al.

(10) Patent No.: US 7,472,667 B2
(45) Date of Patent: Jan. 6, 2009

(54) PERIOD INDICATOR

(75) Inventors: Yoshihide Mochizuki, Shizuoka (JP);
Yoshiaki Ishino, Shizuoka (JP);
Yoshiteru Kanomata, Shizuoka (JP);
Makoto Sato, Shizuoka (JP)

(73) Assignees: Sumitomo Chemical Co., Ltd., Osaka (JP); Nippon Paper Papylia Company, Limited, Shizuoka (JP)

( * ) Notice: Subject to any disclaimer, the term of this patent is extended or adjusted under 35 U.S.C. 154(b) by 249 days.

(21) Appl. No.: 10/499,152

(22) PCT Filed: Dec. 18, 2002

(86) PCT No.: PCT/JP02/13212

§ 371 (c)(1),
(2), (4) Date: Jun. 18, 2004

(87) PCT Pub. No.: WO03/052721

PCT Pub. Date: Jun. 26, 2003

(65) Prior Publication Data

US 2005/0078013 A1    Apr. 14, 2005

(30) Foreign Application Priority Data

Dec. 19, 2001  (JP)  ............................. 2001-385558

(51) Int. Cl.
G04F 1/02    (2006.01)

(52) U.S. Cl. ........................................ 116/206; 422/57

(58) Field of Classification Search ............... 422/55, 422/56, 57, 58, 59, 60; 116/206
See application file for complete search history.

(56) References Cited

U.S. PATENT DOCUMENTS

| | | | | | |
|---|---|---|---|---|---|
| 3,520,124 | A | * | 7/1970 | Myers | 368/92 |
| 3,723,064 | A | * | 3/1973 | Liotta | 436/66 |
| 4,028,876 | A | * | 6/1977 | Delatorre | 368/89 |
| 4,195,056 | A | * | 3/1980 | Patel | 422/56 |
| 4,271,121 | A | * | 6/1981 | Diller et al. | 422/56 |
| 4,478,792 | A | * | 10/1984 | McConnaughey et al. | 422/56 |

(Continued)

FOREIGN PATENT DOCUMENTS

JP    63-24961    5/1988

(Continued)

*Primary Examiner*—R. A. Smith
(74) *Attorney, Agent, or Firm*—McDermott Will & Emery LLP

(57) ABSTRACT

A period indicator including a liquid-permeable substrate and an indicative section which is overlaid on a portion of the substrate and which is formed from a liquid-permeable material having a low light refractive index, the indicator containing a volatile liquid, wherein the indicative section is formed by coating a surface of the substrate with an indicative-section-forming material prepared by mixing a binder and finely divided particulate matter having a low light refractive index, the indicative section is composed of two or more regions, and the regions differ in height from one another as measured from the surface of the substrate, as the coating amounts per unit area of the indicative section forming material in respective regions differ from one another. Since the period indicator can indicate the chemical-containing state stepwise, it is useful for indicating the available period of use of a chemical such as a mothproofing agent, an insecticide, a deodorant, or a fragrance.

3 Claims, 4 Drawing Sheets

U.S. PATENT DOCUMENTS

| | | | |
|---|---|---|---|
| 4,629,330 A * | 12/1986 | Nichols | 368/89 |
| 4,921,636 A * | 5/1990 | Traas | 252/408.1 |
| 5,797,344 A * | 8/1998 | Ramsey et al. | 116/206 |
| 5,891,811 A * | 4/1999 | Ashida et al. | 442/71 |
| 6,228,804 B1 * | 5/2001 | Nakashima | 503/226 |
| 6,814,909 B1 * | 11/2004 | Sakurai et al. | 264/41 |
| 2005/0078013 A1 * | 4/2005 | Mochizuki et al. | 340/870.16 |

FOREIGN PATENT DOCUMENTS

| | | | |
|---|---|---|---|
| JP | 01250844 A * | 10/1989 | |
| JP | 04-49917 | 8/1992 | |
| JP | 05-938 | 1/1993 | |
| JP | 05-14983 | 2/1993 | |
| JP | 06-18676 | 1/1994 | |
| JP | 07-244460 | 9/1995 | |
| JP | 08073301 A * | 3/1996 | |
| JP | 08-101285 | 4/1996 | |
| JP | 08-106251 | 4/1996 | |
| JP | 08286612 A * | 11/1996 | |
| JP | 2603827 | 1/1997 | |
| JP | P3045651 | 3/2000 | |
| JP | 2003308015 A * | 10/2003 | |
| WO | WO 2004013828 A1 * | 2/2004 | |

\* cited by examiner

PERIOD INDICATOR

TECHNICAL FIELD

The present invention relates to a period indicator with which users can determine the effective period; i.e., the time remaining until expiration, of a liquid chemical or a similar substance. More particularly, the invention relates to a period indicator capable of showing the quantity of the remaining liquid, such as a liquid chemical, in a stepwise manner until the liquid arrives at the endpoint of its effective period.

BACKGROUND ART

Hitherto, in order to warn users of mothproofing agents, insecticides, deodorants, fragrance, and similar products that the term of efficacy of such chemicals is about to expire, there have been proposed various types of period indicators which display the quantity-related status of the liquid chemical.

For example, Japanese Patent Publication (kokoku) No. SHO 63-24961 or Japanese Utility Model Publication (kokoku) No. HEI 5-938 discloses a sheet structure having an indicative section and impregnated with a liquid chemical. The sheet structure includes a substrate formed of a chemical-liquid-permeable material, and, on the entirety or on a portion of one surface of the substrate, the indicative section formed from a chemical-liquid-permeable material having a low light refractive index. According to the disclosures of these publications, the chemical-liquid-permeable material having a low light refractive index for forming the indicative section employs, for example, amorphous silica. During the period in which the chemical is present, the indicative section remains transparent, whereas when the chemical has volatilized and been lost, the indicative section becomes opaque, whereby the user can know the final stage that the period of efficacy of the chemical has expired.

In recent years, there has arisen consumers' need for diversified modes of display, and to meet such need, there have been proposed indicators which can indicate not only the endpoint of the effective period but also the early stage or mid stage of the effective period.

Japanese Patent No. 3045651 discloses a period indicator having indicative portions on the surface of a substrate, wherein one indicative portion can show the final stage of the effective period and additionally another indicative portion can show an early stage or mid stage of the effective period. For showing that the final stage is approaching, an indicative layer having a low light refractive index is employed, whereas for showing that the product is in the early stage or middle stage of its service life, an indicative layer having a higher reflectance as compared with that of the substrate is employed. With this structure, since the display for showing the early stage or middle stage of use persists even when the final stage of service life, where the chemical is volatilized and lost, is approaching, measures must be taken so as mask the persisting sign with the sign showing the endpoint of the period, or alternatively, the persisting signs are left to show themselves but together with the sign showing the endpoint of the period. In either case, limitations are imposed on the letters or marks to be used for display.

Japanese Patent Application Laid-Open (kokai) No. HEI 8-106251 discloses use of a non-woven fabric as the chemical-liquid-permeable indicative material having a low light refractive index. It discloses that through use of a non-woven fabric whose density is partially changed, between the low density portion and the high density portion, change of color can be made to occur with a time lag, thereby permitting display of the level of volatilization of the chemical in a stepwise manner. Since this approach employs non-woven fabric, separate means such as printing onto the non-woven fabric is needed so as to display letters or marks.

As many functions for attaining diversified modes of display have been added, there have arisen needs for modification of the composition of the material that forms the indicative section, making production steps intricate and increasing costs.

DISCLOSURE OF THE INVENTION

The present invention contemplates to provide a period indicator which meets the above-mentioned trend calling for diversified display modes, and specifically, the invention provides a period indicator including an indicative section which is formed from a single component material so as to be able to attain a stepwise display through a simple process, thereby leading to an improved display performance.

The present invention has been accomplished on the basis of the following inventors' finding. When a liquid is contained in a liquid permeable indicative substrate on which a liquid permeable indicative section having a low light refractive index is partially overlaid, the indicative section is rendered transparent and thus invisible. After that, when the liquid is allowed to volatilize to thereby reduce the amount of the remaining liquid, indicative signs can be observed more easily in portions bearing larger amounts of coating per unit area of the indicative section and thus presenting a higher elevation from the surface of the substrate, as a result of accelerated speed of becoming opaque.

Accordingly, the present invention is directed to a period indicator comprising a liquid-permeable substrate and an indicative section which is overlaid on a portion of the substrate and which is formed from a liquid-permeable material having a low light refractive index, the indicator containing a volatile liquid, characterized in that the indicative section is formed by coating a surface of the substrate with an indicative-section-forming material prepared by mixing a binder and finely divided particulate matter having a low light refractive index, the indicative section comprises two or more regions, and the regions differ in height from one another as measured from the surface of the substrate, as_coating amounts per unit area of the indicative section forming material in the two or more regions differ from one another.

The present invention is also directed to a period indicator as described above, in which the two or more regions that form the indicative section are discretely disposed on the substrate.

The present invention is also directed to a period indicator as described above, in which each of the coating amounts per unit area of the indicative section forming material in the two or more regions that form the indicative section is within the range of 4 to 150 $g/m^2$, with the coating amount in a region where the coating amount is the smallest being 4 to 40 $g/m^2$ and difference in the coating amounts between the two or more regions being not less than 5 $g/m^2$.

In the present invention, no particular limitations are imposed on the liquid-permeable substrate, so long as it meets the following conditions: has liquid-retaining ability, falls under the class of so-called porous structured materials, including paper materials (such as cardboard, filter paper, and synthetic-fiber-admixed paper), non-woven fabric, felt-like fabric, inorganic fiber sheets, and ceramic- or plastic-base porous materials; is capable of transferring in an orderly manner the remaining liquid contained therein in accordance with the volatilization state of the liquid, and is chemically inert to the liquid to be contained therein. In order to make the sign more clearly visible, preferably, the entirety of the substrate or the substrate surface on which the indicative section is formed is colored. So long as the purposes of the present invention are attained in relation to retention, volatilization, and transfer of liquid, the "substrate" of the present invention encompasses the case where a colored layer is provided on the surface of the substrate.

No particular limitation is imposed on the shape of the substrate, and examples thereof include sheet, block, and cylinder. Likewise, no particular limitation is imposed on the geometry of the surface, and either a flat plane or a curved plane can be employed so long as the indicative section can be formed thereon. To facilitate formation of the indicative section, the substrate preferably has a sheet form, in view that this form is advantageous in handling during printing or coating.

In the present invention, the liquid-permeable, finely divided particulate matter contained in the indicative-section-forming material has low light refractive index. Specifically, it is finely divided particulate matter of a white inorganic pigment such as amorphous silica, kaolin, or calcium carbonate, or an organic pigment such as a plastic pigment. Of these, amorphous silica is preferred. Amorphous silica may be in the form of any of synthesized amorphous silica fine powder, hydrated amorphous silicon dioxide, and ultra-fine hydrated silicate powder, and is commercially available under the trade names of Tokusil GU-NP (product of Tokuyama Corporation), Nipgel AZ-200 (product of Nippon Silica Industry Co., Ltd.), and Mizukasil P-78A (product of Mizusawa Industrial Chemicals Ltd.).

The indicative section of the present invention is formed using a material prepared by mixing a binder and the above-mentioned liquid-permeable, finely divided particulate matter having a low light refractive index. A coloring agent may be incorporated to the indicative section. In such a case, however, in order to prevent the indicative section from becoming recognizable when the indicative section contains a liquid and becomes transparent, the color must be a color similar to, or a color that cannot be distinguished from, the color assumed by the substrate surface, as determined visually.

Examples of the binder include vinyl acetate, EVA, NBR, SBR, acrylic latex, and other types of latex. Acrylic binders include Nikasol RX-301C, Nikasol RX-864S, and Nikasol FX-329 (products of Nippon Carbide Industries Co., Inc.).

The amount of a binder to be incorporated must fall within a certain range, wherein below the lower limit the finely divided particulate matter will no longer be held securely, and above the upper limit effective liquid permeability will no longer be obtained. In the case where the indicative-section-forming material is applied by way of coating, generally, a preferred amount of the binder falls within a range of 10-30 parts by mass with respect to 100 parts by mass of the finely divided particle matter. When coating is performed through printing, particularly in the case of screen printing, the amount of the binder is preferably 50 parts by mass or thereabouts with respect to 100 parts by mass of the finely divided particulate matter. A polymer substance, which serves as a viscosity modifier, may also be incorporated.

The indicative section disposed on the surface of the substrate through coating forms a layer in which fine particles of a pigment and binder particles having a smaller size cohere together so as to leave pores between the particles. Since the fine particles of the pigment and liquid have a similar refractive index, when the pores in the indicative section are filled with the liquid, the indicative section becomes transparent. As volatilization of the liquid proceeds, supply of the liquid from the substrate to the indicative section decreases, to thereby leave pores in the indicative section. This results in an opaque indicative section, which can be visually perceived. Therefore, the thus-configured indicative section can serve as an indicator for the endpoint, which warns that the liquid has been volatilized and the service term (effective period) has expired.

When the amount of coating per unit area is increased, the height of the indicative section as measured from the substrate surface becomes high. The present inventors have found that development of a sign occurs quicker with increasing amount of coating applied per unit area of indicative section and with increasing height of the indicative section as measured from the substrate surface. That is, in the case where two indicators have substrates of the same size, and are identical in terms of the position of the indicative section disposed on the substrate and the shape of the indicative section, a difference in the coating amount per unit area of the indicative section—i.e., a difference in the height as measured from the substrate surface—results in development of a sign with a time lag. Specifically, the greater the height from the substrate surface, the earlier the moment of development of a sign.

One feature of the present invention resides in that the indicative section is formed of two or more regions, the regions differing in the coating amount per unit area, and therefore also differing in the height as measured from the substrate surface. These two or more regions develop signs with a time lag, providing stepwise indication with respect to the quantity of residual liquid. That is, as volatilization of the liquid contained in the indicative section proceeds, a region bearing a larger amount of coating per unit area and thus having a greater height as measured from the substrate surface is subject to insufficient transfer of liquid, permitting an indication conveyed thereby to become noticeable earlier. Of a plurality of regions, the region that bears the least amount of coating per unit area and thus has the smallest height as measured from the substrate surface comes last to develop an indication.

In each region of the indicative section, the amount of coating per unit area is 4 to 150 g/m$^2$. An amount less than 4 g/m$^2$ is not preferred because low masking performance and insufficient indicative function may result, whereas if the amount of coating is increased, repetition of printing or a similar coating operation may be required, permitting easy occurrence of failure such as printing mackle. Therefore, the upper limit of the coating amount per unit area is preferably 150 g/m$^2$. Among a plurality of regions, the region bearing the least amount of coating preferably has a coating amount of 4 to 40 g/m$^2$, more preferably 10 to 40 g/m$^2$.

The difference in coating amount between different regions is preferably not less than 5 g/m$^2$, more preferably not less than 10 g/m$^2$, still more preferably not less than 15 g/m$^2$. When the difference in coating amount is less than 5 g/m$^2$, respective signs are developed with an unacceptably short time lag, resulting in an unclear display.

The height of respective regions that constitute the indicative section as measured from the substrate surface is calculated from the density of the indicative-section-forming material and the coating amount. Specifically, the height of a region as measured from the substrate surface is obtained through dividing the amount of coating per unit area (g/m$^2$) by the density (g/cm$^3$).

The density of an indicative-section-forming material which is suitable for forming the indicative section of the present invention ranges from 0.3 to 1.2 g/cm$^3$. When amorphous silica is employed as the finely divided particulate matter, the density falls within a range of 0.3 to 0.6 g/cm$^3$. For example, when the density of the indicative-section-forming material is 0.46 g/cm$^3$, a preferred value of difference in height between regions differing in terms of coating amount is 10.9 µm or more.

Even when respective indicative regions have the same coating amount per unit area, if the regions have different sizes, the moment at which a sign is developed is affected; i.e., in the case of a larger coated area and a wider coated portion, sign development tends to occur from the periphery of the coated portion. Therefore, combination of "difference in coating amount per unit area" and "difference in the area of coated portion" can attain more clear stepwise indication. That is, the interval between points in time involved in the stepwise indication can be prolonged by allotting a larger coating amount and a larger coating area to the region intended to develop a sign earlier, and at the same time, allotting a smaller coating amount and a narrow region width to the region intended to develop a sign later.

During volatilization of the liquid contained in the indicative section of the period indicator of the present invention, the indicative section remains transparent and provides no indication. This is because the liquid is sufficiently supplied from the substrate to the indicative section and thus the pores present in the indicative section are filled with the liquid. However, when the amount of the transferring liquid becomes insufficient and the pores present in the indicative section are emptied, the transparency of the section is lost because of diffusion of light, thereby providing a perceivable indication. Accordingly, in order to attain a satisfactory stepwise indication, it is preferred that the coating amount and the coating area of each of the indicative regions are appropriately adjusted in accordance with its corresponding step of the stepwise indication, in consideration of the size, thickness, and liquid content of the substrate. In the case where all the regions of the disposed indicative section are relatively small to thereby allow liquid to be sufficiently supplied from the substrate to the regions, there can be obtained a period indicator which provides a stepwise indication in a considerably late stage of the predetermined period. Also, in the case where a period indicator has large indicative regions and the substrate is relatively small as compared with the size of the indicative regions, liquid supply to the regions tends to diminish, resulting in a tendency to develop indication from a relatively early stage of the predetermined period.

Preferably, the indicative section of the period indicator of the present invention include regions bearing thereon a coating in different amounts so as to attain stepwise indication in two to five steps. When a plurality of regions are provided so as to enable an indication mode of three or more steps, the indicative effect is further promoted.

Respective regions of the indicative section may be formed to represent letters, numerals, symbols, graphics, or combinations thereof. Alternatively, the regions may be configured such that when a coated portion becomes opaque, the remaining portion (i.e., the uncoated portion) presents letters, numerals, symbols, or graphics. The regions are preferably disposed discretely with spaces between the regions. Alternatively, the regions may be disposed so as to abut one another without any space between the regions. Moreover, in each step of stepwise indication, the number of regions that develop an indication is not limited to only one, and a plurality of regions may simultaneously develop such indication.

Also, the indicative section of the period indicator of the present invention is designed such that, in accordance with the decrease in amount of the remaining liquid, an indication emerges sequentially from the region having the largest amount of coating, and when the region having the smallest amount of coating has come to present an indication, the indicative section as a whole completes its showing of indication. In other words, the indicative section can be designed such that the respective regions sequentially develop signs starting from the region of the earliest indication, and when the region of the slowest indication has developed its indication, the entire indicative section conveys a certain message. This mode is beneficial in that the user of the period indicator can received better warning.

All the regions of the indicative section of the period indicator of the present invention can be formed by use of a single coating solution. Only repeating a simple process of printing or coating can provide regions of highly indicative effect.

In order to form the respective regions of the indicative section, any of a variety of coating methods may be employed. Preferably, printing, inter alia, screen printing is employed, and in this case, multi-layer printing may be performed so as to attain the predetermined amount of coating. Also, the indicative substrate having an indicative section thereon encompasses, among others, a structure in which a plate-like or film-like liquid-impermeable covering made of, for example, a synthetic material (such as polyester or polypropylene) or glass is laminated on one surface of a sheet-like material having, on its opposite surface, an indicative section. In this case, the covering may optionally have a layer of adhesives or sticking agent on a surface thereof. Analogously, the indicative substrate also encompasses a structure in which indicative sections are disposed on both front and rear surfaces of the substrate.

No particular limitations are imposed on the shape and the size of the above-described indicative substrate, and these factors can be arbitrarily determined in accordance with the purpose of using the period indicator. For example, the indicative substrate may have a strip shape of 20 mm×54 mm×400 µm (thickness).

In accordance with the length of the active period of indication and purpose of use, the liquid to be contained in the indicative substrate may be appropriately selected from among liquids which exhibit volatility at room temperature or under heat, permeate the indicative substrate, and are chemically inert.

When a chemical which effectively exhibits mothproofing effect, insecticidal effect, or a similar effect is used as the liquid exhibiting volatility, the resultant period indicator serves as an indicator showing the period of efficacy of such a chemical per se.

In the case where a liquid exhibiting no chemical effect is employed, the species and the volume of the liquid are determined so as to fit the effective period of a chemical that requires indication of period.

Some examples of chemicals which exhibit volatility at room temperature or under heat and which can be employed in the period indicator of the present invention are listed below. Those chemicals which exhibit volatility under heat; i.e., which are solid at room temperature and can be used when liquefied after heated to a temperature above the melting point are accompanied by their melting point data.

Examples of mothproofing agents and insecticides include O-(2,2-dichlorovinyl)-O,O-dimethyl phosphate, 1-ethynyl-2-methyl-2-pentenyl 3-(2-methyl-1-propenyl)-2,2-dimethylcyclopropanecarboxylate, 2-methyl-3-allyl-4-oxo-2-cyclopenten-1-yl 2,2,3,3-tetramethylcyclopropanecarboxylate, 2,3,5,6-tetrafluoro-4-methoxymethylbenzyl 3-(1-propenyl)-2,2-dimethylcyclopropanecarboxylate, 2,3,5,6-tetrafluoro-4-methylbenzyl 3-(1-propenyl)-2,2-dimethylcyclopropanecarboxylate, 2,3,5,6-tetrafluoro-4-methoxymethylbenzyl 3-(2-methyl-1-propenyl)-2,2-dimethylcyclopropanecarboxylate, 2-methyl-3-allyl-4-oxo-2-cyclopenten-1-yl 3-(2-methyl-1-propenyl)-2,2-dimethylcyclopropanecarboxylate, 2-methyl-3-propargyl-4-oxo-2-cyclopenten-1-yl 3-(2-methyl-1-propenyl)-2,2-dimethylcyclopropanecarboxylate, 2,3,5,6-tetrafluorobenzyl 3-(2,2-dichloroethenyl)-2,2-dimethylcyclopropanecarboxylate (m.p.: 32° C.), chlorpyrifos-methyl (m.p.: 40-50° C.), and 4-hydroxy-6-methyl-3-(4-methylpentanoyl)-2-pyrone (m.p.: 40-50° C.).

Examples of synergists (auxiliary agents) for enhancing performance of the mothproofing agents and insecticides include N-(2-ethylhexyl)-bicyclo[2.2.1]-hepta-5-ene-2,3-dicarboxyimide and piperonyl butoxide.

Examples of repellents include N,N-diethyl-m-toluamide, ethyl 3-(N-butyl-N-acetyl)-aminopropionate, sec-butyl 2-(2-hyrdoxy-ethyl)-piperidine-1-carboxylate, 2-hydroxyethyl-n-octyl sulfide, carane-3,4-diol (m.p.: about 30° C.), and p-menthane-3,8-diol (m.p.: 65-70° C.).

Examples of plant-originating essential oils include lavender oil, hinoki oil, clove oil, lemongrass oil, lemon oil, lime oil, orange oil, ylang ylang oil, oregano oil, cinnamon oil, thyme oil, sage oil, rosemary oil, peppermint oil, chamomile oil, caraway oil, coriander oil, pine oil, geranium oil, eucalyptus oil, hyssop oil, and patchouli oil.

Examples of antibacterial, antifungal agents include hiba acidic oil, allyl isocyanate, phenethyl isocyanate, thymol, carvacrol, 3-methyl-4-isopropylphenol, and hinokitiol (m.p.: 50-60° C.).

Examples of volatile liquids which exhibit no chemical effect and may be employed include water, alcohols such as ethanol, and isoamyl acetate for short term display; glycerin, glycols such as propylene glycol and triethylene glycol, and fragrances such as linalool and geraniol for moderately long term display; and lauryl alcohol, dimethyl phthalate, benzyl benzoate, isopropyl myristate, silicone oil, and liquid mixtures thereof for long term display (extending over one month or longer).

To the aforementioned liquids, other components such as a volatility regulator may be added in such an amount that does not affect the indicative functions of the liquids. The volatility regulator; e.g., liquid paraffin, jojoba oil, silicone oil, castor oil, pine oil, or mint oil, can be incorporated in an amount of 20 mass % or less.

Any of these liquids can be incorporated into the aforementioned indicative substrate through a known method; e.g., immersion, injection, or impregnation by dropwise addition.

BEST MODE FOR CARRYING OUT THE INVENTION

Figure 1:
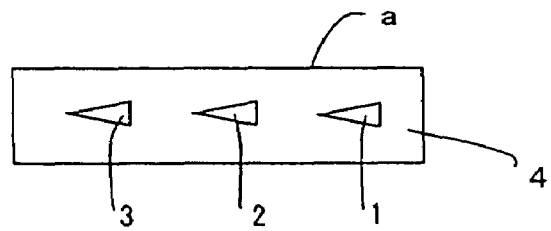
FIG. 1 is a schematic plan view showing an example indicative substrate of the period indicator of the present invention.
Figure 2:
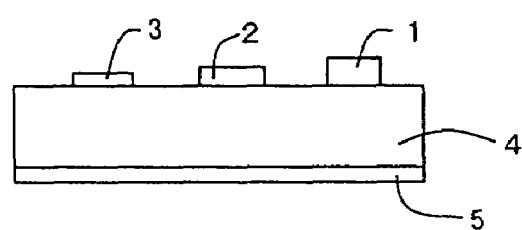
FIG. 2 is a schematic front view of the indicative substrate of the period indicator shown in FIG. 1.

Referring to FIGS. 1 and 2, portions of one surface of a substrate 4 which had been colored blue were coated with an indicative-section-forming material containing a binder and finely divided particle matter of a white inorganic pigment which has a low light refractive index. The indicative-section-forming material allows a liquid chemical to permeate through the material. Thereby, an indicative substrate "a" of a period indicator was formed, wherein a white indicative section consisting of three isosceles triangular regions 1, 2, and 3 was disposed on the surface of one side of the substrate "a". The surface of the other side of the substrate which bears no indicative section was covered by a covering 5.

Since the coating amount per unit area was sequentially reduced from region 1 to region 2 then to region 3, the height as measured from the substrate surface was the largest in region 1, followed by region 2, and the smallest in region 3. A period indicator A was produced by impregnating the indicative substrate "a" with an oily liquid (not shown).

The indication mechanism of the period indicator of the present invention will next be described with reference to FIGS. 3 to 5 which illustrate the course of development of an indication in respective regions of the indicative section until the contained liquid has been completely lost through volatilization. The development of color is described as follows (orderly arranged starting from intense blue): dark→blue→blue→light blue→pale blue→pale whitey blue→white.

Although not shown, in the initial stage, when the indicative substrate "a" is sufficiently filled with a liquid, substrate 4 becomes to assume an intense color, specifically, dark blue. Since all the regions 1, 2, and 3 of the indicative section become transparent because of their low light refractive index, they hand over the color of the substrate surface and thus remain unnoticeable. In this stage, volatilization of the liquid begins. Although the liquid is allowed to volatilize from every surface of the period indicator, any change is yet to be observed on the surfaces of the indicator. This represents a situation where the liquid is sufficiently transferred from the substrate to the indicative section.

Figure 3:
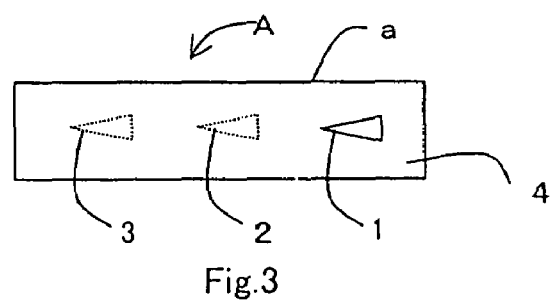
FIG. 3 is a schematic plan view showing a state where only one region of the indicative section develops an indication as a result of volatilization of the liquid contained in the indicative substrate of the period indicator shown in FIGS. 1 and 2.

FIG. 3 shows a situation where volatilization of the liquid has proceeded to some degree, and as a result, region 1 has become recognizable as a small triangle which assumes a color of light blue with a weak contrast against the color developed by the substrate surface.

Figure 4:
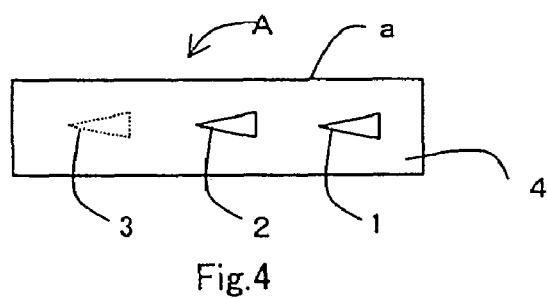
FIG. 4 is a schematic plan view showing a state where two regions of the indicative section develop an indication after volatilization of the liquid proceeds from the state shown in FIG. 3.

FIG. 4 shows a situation where volatilization of the liquid has proceeded further, and as a result, region 1 which assumes a color of pale blue with a moderately increasing contrast against the color developed by the substrate surface, is recognizable, and simultaneously, region 2 has become recognizable as a small triangle which assumes a color of light blue with a weak contrast against the color developed by the substrate surface.

Figure 5:
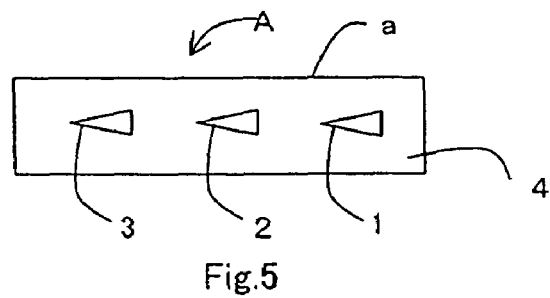
FIG. 5 is a schematic plan view showing a state where all three regions of the indicative section develop an indication after volatilization of the liquid further proceeds from the state shown in FIG. 4.

FIG. 5 shows a situation where volatilization of the liquid has proceeded even further, and as a result, regions 1 and 2 are displayed clearly with enhanced whiteness, and region 3, which assumes a color of pale whitey blue with a strong contrast against the color developed by the substrate surface, has become clearly noticeable.

When volatilization further proceeds and almost the entirety of the contained liquid has been lost, regions 1, 2, and 3 all increase the level of whiteness, showing the whiteness similar to that presented by the indicative section of the indicative substrate "a" before it was impregnated with the liquid.

Figure 6:
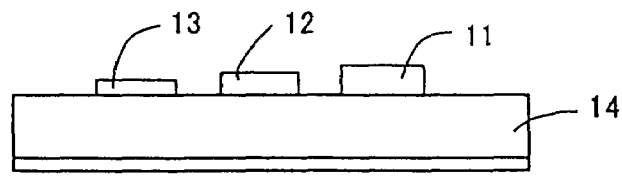
FIG. 6 is a schematic front view showing another example indicative substrate of the period indicator of the present invention.
Figure 7:
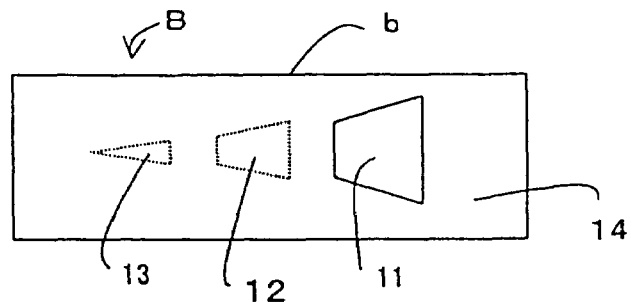
FIG. 7 is a schematic plan view showing a state where only one region of the indicative section develops an indication as a result of volatilization of the liquid contained in the indicative substrate of the period indicator shown in FIG. 6.
Figure 8:
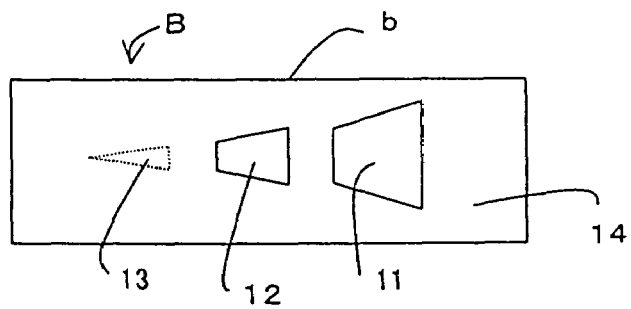
FIG. 8 is a schematic plan view showing a state where two regions of the indicative section develop an indication after volatilization of the liquid proceeds from the state shown in FIG. 7.
Figure 9:
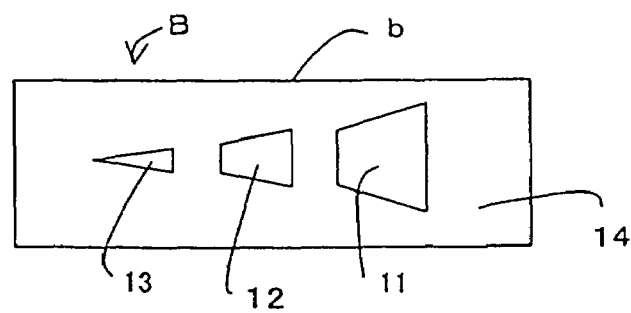
FIG. 9 is a schematic plan view showing a state where all three regions of the indicative section develop an indication after volatilization of the liquid further proceeds from the state shown in FIG. 8.

FIG. 6 is a front view showing another indicative substrate of a period indicator, and FIGS. 7 through 9 show the course of development of indication in respective regions of the indicative section during the period until the liquid in the period indicator has been completely volatilized.

Portions of one surface of a substrate 14 which had been colored blue were coated with an indicative-section-forming material containing a binder and finely divided particle matter of a white inorganic pigment which has a low light refractive index. The indicative-section-forming material allows a liquid chemical to permeate through the material. Thereby, an indicative substrate "b" of a period indicator was formed, wherein on the surface of the substrate "b" was disposed a white indicative section including three regions 11, 12, and 13 which were discretely disposed with spaces between the regions, the regions representing three segments or parts composing an isosceles triangle.

The area proportions of the regions 11, 12, and 13 are 4.7:2.9:1. Since regions 11, 12, and 13 are configured to bear coating in progressively smaller amounts per unit area in this sequence, region 11 is the tallest, region 12 is second to region 11, and region 13 is the shortest in height as measured from the substrate surface. A period indicator B was produced by impregnating the indicative substrate "b" with an oily liquid (not shown).

FIG. 7 shows a situation where, as volatilization of liquid has progressed to some extent, region 11, having a large area and bearing a great amount of coating, has become recognizable as a trapezoid which assumes a color of light blue with a low contrast against the color developed by the substrate surface.

FIG. 8 shows a situation where volatilization of liquid has further progressed, and as a result, region 11 has now become recognizable as having enhanced whiteness and moderately high contract against the color developed by the substrate surface, and region 12 has become recognizable as a light blue trapezoid having a low contrast against the color developed by the substrate surface.

FIG. 9 shows a situation where volatilization of liquid has even further progressed, and as a result, regions 11 and 12, assuming a virtually white color, are displayed clearly, and region 13 is recognizable as a light blue trapezoid.

When volatilization further proceeds and almost the entirety of the contained liquid has been lost, regions 11, 12, and 13 all increase the level of whiteness, showing the whiteness similar to that presented by the indicative section of the indicative substrate "b" before it was impregnated with the liquid.

Figure 10:
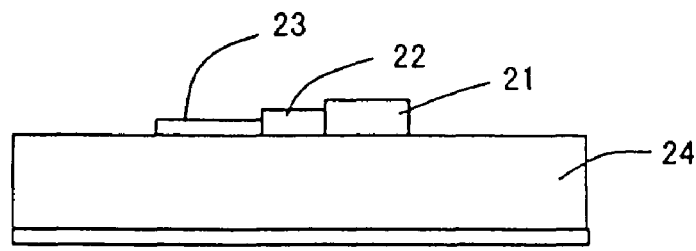
FIG. 10 is a schematic front view showing yet another example indicative substrate of the period indicator of the present invention.
Figure 11:
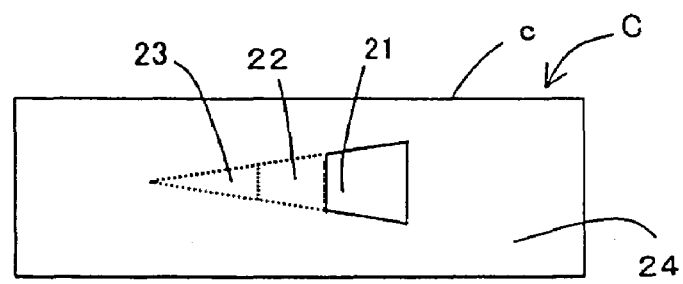
FIG. 11 is a schematic plan view showing a state where only one region of the indicative section develops an indication as a result of volatilization of the liquid contained in the indicative substrate of the period indicator shown in FIG. 10.
Figure 12:
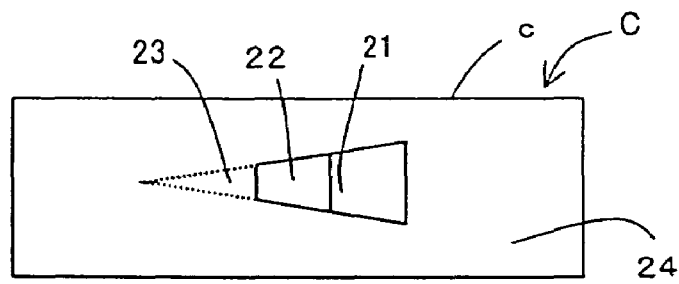
FIG. 12 is a schematic plan view showing a state where two regions of the indicative section develop an indication after volatilization of the liquid proceeds from the state shown in FIG. 11.
Figure 13:
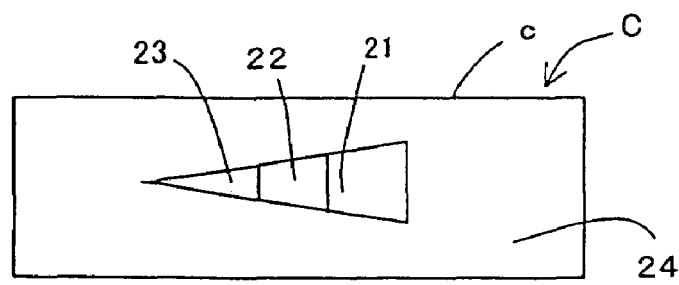
FIG. 13 is a schematic plan view showing a state where all three regions of the indicative section develop an indication after volatilization of the liquid further proceeds from the state shown in FIG. 12.

FIG. 10 is a front view showing yet another indicative substrate of a period indicator, and FIGS. 11 through 13 show the course of development of indication in respective regions of the indicative section during the period until the liquid in the period indicator has been completely volatilized.

Portions of one surface of a substrate 24 which had been colored blue were coated with an indicative-section-forming material containing a binder and finely divided particle matter of a white inorganic pigment which has a low light refractive index. The indicative-section-forming material allows a liquid chemical to permeate through the material. Thereby, an indicative substrate "c" of a period indicator was formed. This substrate "c" was configured such that, on the surface of the substrate "c" was disposed a white indicative section including three regions 21, 22, and 23 arranged to flank one on another with no space between the regions, the regions representing three segments or parts composing an isosceles triangle.

The area proportions of the regions 21, 22, and 23 are 4.7:2.9:1. Since regions 21, 22, and 23 are configured to bear coating in progressively smaller amounts per unit area in this sequence, region 21 is the tallest, region 22 is second to region 21, and region 23 is the shortest in height as measured from the substrate surface. A period indicator C was produced by impregnating the indicative substrate "c" with an oily liquid (not shown).

FIG. 11 shows a situation where, as volatilization of liquid has progressed to some extent, region 21, having a large area and bearing a great amount of coating, has become recognizable as a trapezoid which assumes a color of light blue with a low contrast against the color developed by the substrate surface.

FIG. 12 shows a situation where volatilization of liquid has further progressed, and as a result, region 21 has now become recognizable as having enhanced whiteness and moderately high contract against the color developed by the substrate surface, and region 22 has become recognizable as a light blue trapezoid having a low contrast against the color developed by the substrate surface.

FIG. 13 shows a situation where volatilization of liquid has even further progressed, and as a result, regions 21 and 22, assuming a virtually white color, are displayed clearly, and region 23 is recognizable as a light blue trapezoid.

When volatilization further proceeds and almost the entirety of the contained liquid has been lost, regions 21, 22, and 23 all increase the level of whiteness, showing the whiteness similar to that presented by the indicative section of the indicative substrate "c" before it was impregnated with the liquid.

Figure 14:
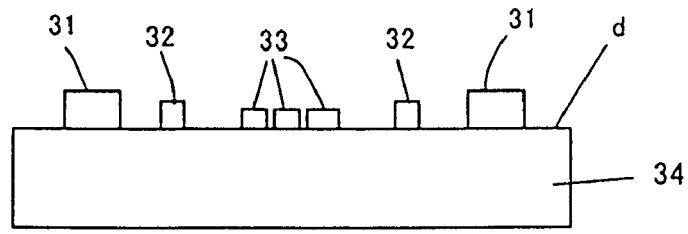
FIG. 14 is a schematic front view showing still another example indicative substrate of the period indicator of the present invention.
Figure 15:
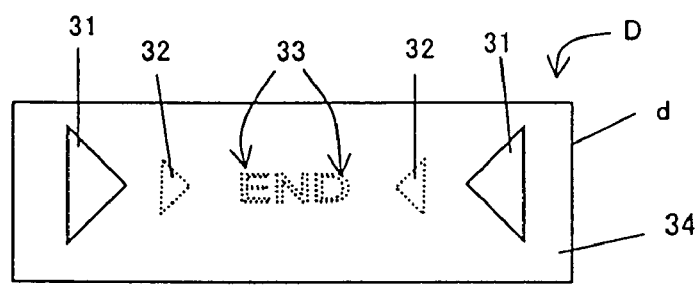
FIG. 15 is a schematic plan view showing a state where two regions of the indicative section develop an indication as a result of volatilization of the liquid contained in the indicative substrate of the period indicator shown in FIG. 14.
Figure 16:
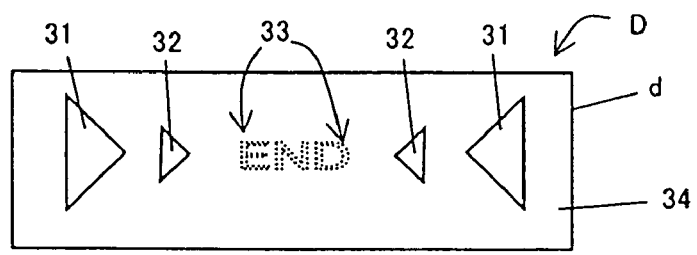
FIG. 16 is a schematic plan view showing a state where four regions of the indicative section develop an indication after volatilization of the liquid proceeds from the state shown in FIG. 15.
Figure 17:
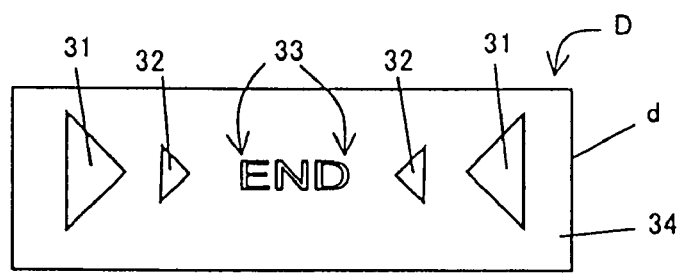
FIG. 17 is a schematic plan view showing a state where all regions of the indicative section develop an indication after volatilization of the liquid further proceeds from the state shown in FIG. 16.

FIG. 14 is a front view showing still another indicative substrate of a period indicator, and FIGS. 15 through 17 show the course of development of indication in respective regions of the indicative section during the period until the liquid in the period indicator has been completely volatilized.

Portions of one surface of a substrate 34 which had been colored blue were coated with an indicative-section-forming material containing a binder and finely divided particle matter of a white inorganic pigment which has a low light refractive index. The indicative-section-forming material allows a liquid chemical to permeate through the material. Thereby, an indicative substrate "d" of a period indicator was formed. This substrate "d" was configured such that, on the surface of the substrate "d" was disposed a white indicative section including three regions 31, 32, and 33. Regions 31, 32 and 33 represent a large triangle, a small triangle, and letters "END," respectively. Since regions 31, 32, and 33 are configured to bear coating in progressively smaller amounts per unit area in this sequence, region 31 is the tallest, region 32 is second to region 31, and region 33 is the shortest in height as measured from the substrate surface. A period indicator D was produced by impregnating the indicative substrate "d" with an oily liquid (not shown).

FIG. 15 shows a situation where, as volatilization of liquid has progressed to some extent, region 31, having a large area and bearing a great amount of coating, has become recognizable as a triangle which assumes a color of light blue with a low contrast against the color developed by the substrate surface.

FIG. 16 shows a situation where volatilization of liquid has further progressed, and as a result, region 31 has now become recognizable as having enhanced whiteness and moderately high contrast against the color developed by the substrate surface, and region 32 has become recognizable as a light blue triangle having a low contrast against the color developed by the substrate surface.

FIG. 17 shows a situation where volatilization of liquid has even further progressed, and as a result, regions 31 (large triangles) and regions 32 (small triangles) assume a virtually white color and are displayed clearly, and region 33 is recognizable as letters "END" in light blue.

When volatilization further proceeds and almost the entirety of the contained liquid has been lost, regions 31, 32, and 33 all increase the level of whiteness, showing the whiteness similar to that presented by the indicative section of the indicative substrate "d" before it was impregnated with the liquid.

In the period indicator of the present invention, in each step in stepwise indication, the indicative section starts to develop color when vacant pores are produced in the vicinity of the surface of the indicative section. Under such a situation, however, the lower part of the indicative section remains to be filled with a liquid, and therefore, masking performance for the indicative section is low. Therefore, the indicative section assumes a diluted color of that of the substrate surface. For example, when the substrate is blue, the blue color is diluted to assume pale blue. As volatilization of the liquid proceeds, generation of vacant pores extends to the lower part of the indicative section. In this situation also, so long as the substrate contains the liquid, supply of the liquid to the indicative section will never stop, and therefore, the number of vacant pores in the indicative section gradually increases until volatilization is complete, resulting in a gradual advancement in development of indication (i.e., becoming whitey). The greater the amount of coating applied to the indicative section, the greater the total vacant pore volume in the indicative section, calling for an increased amount of the liquid to fill the vacant pores in the indicative section. Therefore, when the liquid content of the substrate is reduced due to volatilization of the liquid, shortage of liquid supply occurs earlier, permitting earlier start of indication.

Accordingly, the present invention provides a period indicator which can effectively invite the user's attention, since a variety of signs—which differ in the moment of developing indication—are available by simply tuning the amount of coating or the area of coating of the indicative section, either individually or in combination.

The present invention will next be described by way of examples, which should not be construed as limiting the invention thereto. Evaluation of the period indicator of the present invention regarding the development of a sign in the indicative section thereof was performed as follows. [Evaluation of indication development in the indicative section] Each period indicator was left to stand under predetermined conditions, whereby liquid contained therein was allowed to volatilize. Development of a sign in the indicative section was visually observed and evaluated on the basis of the following criteria.

DD: Sign can't be recognized.
CC: Blurred sign substantially prevents recognition of the sign.
BB: Difference in color at border portions is observed, whereby sign can be recognized.
AA: Great difference in color at border portions is observed, whereby sign can be clearly recognized.

EXAMPLE 1

An indicative substrate "a" as shown in FIGS. 1 and 2 was prepared in the following manner.

A polypropylene film (covering 5) was overlaid on the surface of one side of a blue wet-laid nonwoven fabric, thereby forming a substrate 4. On the substrate 4, an indicative section containing three aligned, isosceles triangular regions 1, 2, and 3 was formed through screen printing by use of a material containing amorphous silica. The amounts of coating per unit surface area of the regions 1, 2, and 3 of the indicative section were adjusted to three different levels: 120 g/m$^2$, 55 g/m$^2$, and 35 g/m$^2$, respectively. The regions of the indicative section differ in whiteness from one another due to a difference in masking performance caused by different amounts of coating. To the thus-formed indicative substrate "a," oily liquid was incorporated, whereby a period indicator A was prepared.

The above materials and methods are described in more detail below.

Substrate: Blue wet-laid nonwoven fabric (150 g/m$^2$, 20 mm×54 mm×400 μm)
Covering: Polypropylene film (20 mm×54 mm×100 μm)
Indicative-section-forming material: Prepared by mixing amorphous silica and an acrylic binder (solid content ratio: 1/0.5) with additives (i.e., a dispersant (sodium hexametaphosphate) and a viscosity modifier (carboxymethyl cellulose))

Liquid contained: Dimethyl phthalate (80 mg) incorporated through injection.

The above period indicator A was left to stand at room temperature (23° C.) under calm conditions, whereby liquid contained therein was volatilized. During the course of volatilization, development of a sign in the indicative section was visually observed. The results are shown below.

|  |  | Regions | | |
|---|---|---|---|---|
|  |  | 1 | 2 | 3 |
| Amount of liquid contained | 100% | DD | DD | DD |
|  | 73 | CC | DD | DD |
|  | 28 | BB | CC | DD |
|  | 15 | AA | BB | CC |
|  | 8 | AA | AA | BB |
|  | 1 | AA | AA | AA |

EXAMPLE 2

An indicative substrate "b" as shown in FIG. 6 was prepared in the following manner.

Through use of a material similar to that employed in Example 1, an indicative section consisting of regions 11, 12, and 13 was formed on the substrate surface through screen printing. The three regions forming in combination an isosceles triangle were discretely disposed with spaces between the regions. The coating amounts of the indicative-section-forming material applied to the regions were different from one another. The area proportions of the regions 11, 12, and 13 of the indicative section were 4.7:2.9:1. The amounts of coating per unit surface area of the regions 11, 12, and 13 were 82 g/m$^2$, 60 g/m$^2$, and 24 g/m$^2$, respectively. Similar to the case of Example 1, dimethyl phthalate was incorporated into the thus-formed indicative substrate "b", whereby a period indicator B was prepared.

The above period indicator B was left to stand at room temperature (23° C.) under calm conditions, whereby liquid contained therein was volatilized. During the course of volatilization, development of a sign in the indicative section was visually observed. The results are shown below.

|  |  | Regions | | |
|---|---|---|---|---|
|  |  | 11 | 12 | 13 |
| Amount of liquid contained | 100% | DD | DD | DD |
|  | 54 | CC | DD | DD |
|  | 32 | BB | CC | DD |
|  | 19 | BB | CC | DD |
|  | 8 | AA | BB | CC |
|  | 1.5 | AA | AA | BB |

EXAMPLE 3

An indicative substrate "c" as shown in FIG. 10 was prepared in the following manner.

Through use of a material similar to that employed in Example 1, an indicative section consisting of regions 21, 22, and 23 was formed on the substrate surface through screen printing. The three regions forming in combination an isosceles triangle were disposed in contact with one another. The coating amounts of indicative-section-forming material applied to the regions were different from one another. The area proportions of the regions 21, 22, and 23 of the indicative section were 4.7:2.9:1. The amounts of coating per unit surface area of the regions 21, 22, and 23 were 68 g/m$^2$, 35 g/m$^2$, and 18 g/m$^2$, respectively. Similar to the case of Example 1, dimethyl phthalate was incorporated into the thus-formed indicative substrate "c", whereby a period indicator C was prepared.

In order to accelerate changes in development of a sign, the above period indicator C was left to stand under thermostatic conditions (50° C.), whereby liquid contained therein was volatilized. Development of a sign in the indicative section was visually observed. The results are shown below.

|  |  | Regions | | |
|---|---|---|---|---|
|  |  | 21 | 22 | 23 |
| Amount of liquid contained | 100% | DD | DD | DD |
|  | 45 | CC | DD | DD |
|  | 32 | BB | CC | DD |
|  | 19 | BB | BB | CC |
|  | 8 | AA | BB | BB |
|  | 1 | AA | AA | AA |

EXAMPLE 4

An indicative substrate having the same form as an indicative substrate "d" of FIG. 14 except for being colored orange was prepared in the following manner.

A pigment of orange color was applied to a surface of a filter paper (basis weight: 150 g/m$^2$, 30 mm×40 mm×thickness 500 μm) through gravure printing, to thereby prepare a substrate having a surface having a color of L*=73 in the L*a*b* calorimetric system as specified by JIS 8730. No covering was overlaid on the non-colored surface of the substrate. On the colored surface of the substrate, an indicative section containing three regions 31, 32, and 33 was formed through screen printing by use of an indicative-section-forming material similar to that employed in Example 1, the material containing amorphous silica. The region 31 has two isosceles triangular parts which face each other and are separately disposed in the vicinity of opposite ends of the substrate. The region 32 has two smaller isosceles triangular parts which also face each other and are disposed inside the isosceles triangular portions of the region 31. The region 33 is disposed in a center portion on the substrate surface and takes the form of small letters "END." The amounts of coating per unit surface area of the regions 31, 32, and 33 of the indicative section were 32 g/m$^2$, 26 g/m$^2$, and 14 g/m$^2$, respectively.

Into the thus-formed substrate, a mothproofing agent (40 mg) (i.e., 1-ethynyl-2-methyl-2-pentenyl 3-(2-methyl-1-propenyl)-2,2-dimethylcyclopropanecarboxylate) was incorporated through injection, thereby preparing a period indicator.

In order to accelerate changes in development of a sign, the above period indicator was left to stand under thermostatic conditions (40° C.), whereby the mothproofing liquid chemical was volatilized. Development of a sign in the indicative section was visually observed. The results are shown below.

|  |  | Regions | | |
| --- | --- | --- | --- | --- |
|  |  | 31 | 32 | 33 |
| Amount of liquid contained | 100% | DD | DD | DD |
|  | 62 | DD | DD | DD |
|  | 33 | CC | DD | DD |
|  | 26 | CC | CC | DD |
|  | 20 | BB | CC | DD |
|  | 17 | BB | BB | DD |
|  | 8 | BB | BB | CC |
|  | 5 | AA | AA | BB |
|  | 0 | AA | AA | AA |

The period indicator effectively accomplished three-step indication starting from outer portions toward a center portion of the indicator.

INDUSTRIAL APPLICABILITY

The present invention provides a period indicator which displays the quantity-related status of a liquid chemical in a stepwise manner. The period indicator is produced through a simple process by use of an indicative-section-forming material composed of a single component material. The thus-produced period indicator is useful for indicating the period of efficacy of a liquid chemical such as a mothproofing agent, an insecticide, a deodorant, or a fragrance. In addition, the indicator can be configured to have its indicative section consisting of a plurality of regions, so that the respective regions sequentially develop signs starting from the region of the earliest indication, and that when the region of the slowest indication has developed its indication, the entire indicative section conveys a certain message. Therefore, the indicator of the invention can effectively invite the user's attention.

The invention claimed is:

1. A period indicator comprising a liquid-permeable substrate and an indicative section which is overlaid on a portion of the substrate and which is formed from a liquid-permeable material having a low light refractive index, the indicator containing a volatile liquid, wherein the indicative section is formed by coating a surface of the substrate with an indicative-section-forming material prepared by mixing a binder and finely divided particulate matter having a low light refractive index, the indicative section comprises two or more regions, including a first region and a second region, and the regions differ in height from one another as measured from the surface of the substrate, as coating amounts per unit area of the indicative section forming material in the two or more regions differ from one another, wherein the first region is higher than the second region as measured from the surface of the substrate, so that the two or more regions develop signs with a time lag, wherein the sign in the first region is developed quicker than the sign in the second region, providing stepwise indication with respect to the quantity of residual liquid.

2. The period indicator as recited in claim 1, wherein the two or more regions that form the indicative section are discretely disposed on the substrate.

3. The period indicator as recited in claim 1, wherein each of the coating amounts per unit area of the indicative section forming material in the two or more regions that form the indicative section is within the range of 4 to 150 g/m$^2$, with the coating amount in a region where the coating amount is the smallest being 4 to 40 g/m$^2$ and difference in the coating amounts between the two or more regions being not less than 5 g/m$^2$.

* * * * *